(12) United States Patent
Esaka et al.

(10) Patent No.: US 8,097,974 B2
(45) Date of Patent: Jan. 17, 2012

(54) VEHICULAR ELECTRIC POWER SOURCE CONTROLLER

(75) Inventors: Toshinori Esaka, Nishikamo-gun (JP); Minoru Fukasawa, Nishikamo-gun (JP); Hiroshi Tsutsumi, Naka-gun (JP)

(73) Assignees: Toyota Jidosha Kabushiki Kaisha, Toyota (JP); The Furukawa Electric Co., Ltd., Tokyo (JP)

( * ) Notice: Subject to any disclaimer, the term of this patent is extended or adjusted under 35 U.S.C. 154(b) by 164 days.

(21) Appl. No.: 12/308,385

(22) PCT Filed: Jun. 27, 2007

(86) PCT No.: PCT/IB2007/001750
§ 371 (c)(1),
(2), (4) Date: Dec. 12, 2008

(87) PCT Pub. No.: WO2008/001199
PCT Pub. Date: Jan. 3, 2008

(65) Prior Publication Data
US 2010/0231037 A1    Sep. 16, 2010

(30) Foreign Application Priority Data
Jun. 28, 2006 (JP) ................................ 2006-178697

(51) Int. Cl.
*B60L 1/00* (2006.01)
(52) U.S. Cl. .................... 307/9.1; 307/10.1; 307/10.6
(58) Field of Classification Search .................. 307/9.1, 307/10.1, 10.6, 10.7, 10.8
See application file for complete search history.

(56) References Cited

U.S. PATENT DOCUMENTS

| | | | | |
|---|---|---|---|---|
| 3,745,362 | A * | 7/1973 | Ballou | 307/10.6 |
| 4,345,554 | A * | 8/1982 | Hildreth et al. | 123/179.2 |
| 5,691,619 | A | 11/1997 | Vingsbo | |
| 6,765,312 | B1 | 7/2004 | Urlass et al. | |
| 7,298,058 | B2 * | 11/2007 | Matsubara et al. | 307/10.6 |
| 7,634,333 | B2 * | 12/2009 | Matsubara et al. | 701/2 |
| 7,677,215 | B2 * | 3/2010 | Yamaguchi et al. | 123/179.3 |
| 2004/0097329 | A1 * | 5/2004 | Chang | 477/99 |
| 2006/0095197 | A1 * | 5/2006 | Nishi et al. | 701/113 |
| 2006/0175902 | A1 * | 8/2006 | Matsubara | 307/10.3 |
| 2010/0244557 | A1 * | 9/2010 | Ito et al. | 307/9.1 |

FOREIGN PATENT DOCUMENTS

| | | |
|---|---|---|
| DE | 40 28 242 A1 | 3/1992 |
| DE | 199 55 721 A1 | 5/2001 |
| EP | 1 231 696 A2 | 8/2002 |
| EP | 1 318 590 A2 | 6/2003 |
| JP | A-08-020232 | 1/1996 |
| JP | A-10-070844 | 3/1998 |

(Continued)

*Primary Examiner* — Fritz M Fleming
(74) *Attorney, Agent, or Firm* — Oliff & Berridge, PLC

(57) ABSTRACT

A vehicular electric power source controller that controls the electrification of an electrical load mounted in a vehicle includes: a first electrical load that are a portion of the electrical load mounted in the vehicle; a second electrical load that are electrified preferentially over first electrical loads when a vehicle is parked; an electric power source-switching ECU, an ACC relay and an IG relay that switch not only the electrification of the first electrical load to but also the electrification of the second electrical load; and an electric power source management ECU, a parked state ACC relay and a parked state IG relay that switch the electrification of only the second electrical load. The vehicular electric power source controller curbs wasteful electricity consumption while operating an electrical load that is used while the vehicle is parked.

6 Claims, 7 Drawing Sheets

FOREIGN PATENT DOCUMENTS

| | | |
|---|---|---|
| JP | A-11-334498 | 12/1999 |
| JP | A-2005-325832 | 11/2005 |
| JP | A-2006-125351 | 5/2006 |
| JP | A-2007-191015 | 8/2007 |

* cited by examiner

VEHICULAR ELECTRIC POWER SOURCE CONTROLLER

BACKGROUND OF THE INVENTION

1. Field of the Invention

The invention relates to a vehicular electric power source controller that controls the electrification of an electrical load mounted in a vehicle.

2. Description of the Related Art

A conventional air-conditioner control device detects the state of an electric power source, such as the voltage of a high-voltage battery or the like, via a battery management controller. The air-conditioner control device sends an activation signal to an air-conditioner controller in accordance with the result of the detection to activate an electrically powered compressor, and operates the electrically powered compressor to condition the air in the cabin via the air-conditioner controller that is supplied with the activation signal (e.g., see Japanese Patent Application Publication No. JP-A-8-20232). The control device of the air-conditioning device detects the state of an electric power source, such as the voltage of the high-voltage battery or the like, before the electrically powered compressor is operated. In this manner, the control device of the air-conditioning device improves the efficiency of the driving of the electrically powered compressor.

A vehicle is equipped with a plurality of electric power source supply system lines, such as an accessory electric power source, an ignition electric power, etc. In the vehicle, electrical loads that operate on an accessory electric power source, and electrical loads that operate on an ignition electric power source exist as electrical loads that are mounted in the vehicle. In order to operate these electrical loads, it is necessary to electrify the accessory electric power source and the ignition electric power source.

In recent years, there is growing desire or need to operate electrical loads on the accessory electric power source or the ignition electric power source while the vehicle is parked, in which the electric power sources are not in the electrified state. For example, if a user desires that a melody be played when the user gets into the vehicle, it is necessary to operate an audio system when the vehicle is parked. If a user desires that the temperature in the cabin be adjusted to a comfortable range before the user gets into the vehicle, it is necessary to operate the air-condition system while the vehicle is parked.

However, if the accessory electric power source or the ignition electric power source is electrified while the vehicle is parked in order to operate an electrical load that is desired to be used while the vehicle is parked, electric power is supplied also to electrical loads that do not need to be operated while the vehicle is parked. Thus, there will be wasteful consumption of the limited amount of electric power of the source, such as the battery or the like. If a construction in which an electrical load that is desired to be used while the vehicle is parked can be operated even when the accessory electric power source and the ignition electric power source are in the non-electrified state (e.g., a construction in which an electrical load that is desired to be while it vehicle is parked is constantly connected to the battery) is adopted, the wasteful stand-by current (dark current) will increase.

Even in the foregoing related-art technology, if the control device for the air-conditioning device is desired to be used while the vehicle is parked, it is necessary to electrify the accessory electric power source or the ignition electric power source while the vehicle is parked, or to adopt a construction in which air conditioner may be operated even when the accessory electric power source or the ignition electric power source is not electrified.

SUMMARY OF THE INVENTION

The invention provides a vehicular electric power source controller that reduces wasteful electricity consumption when the vehicle is parked while operating an electrical load that is used while the vehicle is parked.

In a vehicular electric power source controller according to an aspect of the invention, the vehicular electric power source controller controls the electrification of an electrical load mounted in a vehicle. The vehicular electric power source controller includes a first electrical load that is a portion of the electrical load mounted in the vehicle; a second electrical load that needs to be electrified preferentially over the first electrical load during a vehicle is parked; a first switching device that switches not only the electrification of the first electrical load but also the electrification of the second electrical load; and a second switching device that switches the electrification of only the second electrical load.

Therefore, the performance of the switching operation by the first switching device electrifies not only the first electrical load but also the second electrical load. When the vehicle is parked, the performance of the switching operation by the second switching device electrifies only the second electrical load. Hence, if an electrical load that is used while the vehicle is parked is assigned as a second electrical load, wasteful electricity consumption is reduced while the vehicle is parked.

When the first switching device outputs an on-command to electrify the second electrical load, the second switching device outputs an off-command to deelectrify the second electrical load. Therefore, even when the second switching device outputs the on-command to electrify the second electrical load, the second switching device outputs the off-command to deelectrify the second electrical load if the first switching device outputs the on-command to electrify the second electrical load. Hence, it is possible to prevent the continuation of a state in which the on-command is output from both the first and second switching devices, and to avoid the interference by the on-commands from the first and second switching devices.

If an on-command, output by the first switching device to electrify the second electrical load, and an off-command, output by the second switching device to deelectrify the second electrical load overlap, priority may be given to carrying out the on-command. Therefore, even when the second electrical load is given incompatible commands (the on-command output by the first switching device and the off-command output by the second switching device), the second electrical load is electrified by the on-command output by the first switching device.

The first electrical load may also include the electrical load that is needed to start the engine. Therefore, while the vehicle is parked, the performance of the switching operation by the second switching devices electrifies only the second electrical load. On the other hand, the performance of the switching operation by the first switching devices not only electrifies the electrical load that is needed to start the engine, but also electrifies the first and second electrical loads.

Furthermore, the second electrical load may include an electrical load that is needed in order to start an engine. Therefore, while the vehicle is parked, performing the switching operation by the second switching device electrifies only the second electrical load, and allows the engine to be started.

On the other hand, performing the switching operation by the second switching device not only allows the engine to be started, but also electrifies the first and second electrical loads.

Switching by the second switching device may also be performed based on a control signal from a terminal device that is capable of wireless communication with the vehicle. Therefore, the electrification of only the second electrical load may be controlled from outside the vehicle.

The operation input device that accepts an operation input from a user may be provided in a cabin, and switching by the first switching device may be performed based on a control signal from the operation input device. Therefore, when the user enters the vehicle, the user can control the electrification of the first and second electrical loads.

The second electrical load may further include an electrical load that is needed in order to control air-conditioning in a cabin. When the vehicle is parked, the electrification of only the air-conditioning-related electrical load may be accomplished by performing the switching operation via the second switching device. Therefore, the condition in the cabin can be made comfortable while the vehicle is parked, and the wasteful electricity consumption is reduced.

The second switching device may also include a prohibiting device that prohibits electrification of the first electrical load to implement the control the electrification of only the second electrical load. As a concrete example of the prohibition device, a diode may be cited.

According to the aspect of the invention, even though a desired electrical load is used while the vehicle is parked, the wasteful electricity consumption is reduced.

BRIEF DESCRIPTION OF THE DRAWINGS

The foregoing and further objects, features and advantages of the invention will become apparent from the following description of example embodiments with reference to the accompanying drawings, wherein like numerals are used to represent like elements and wherein.

DETAILED DESCRIPTION OF THE INVENTION

Hereinafter, example embodiments of present invention will be described in more detail with reference to the accompanying drawings.

Figure 1:
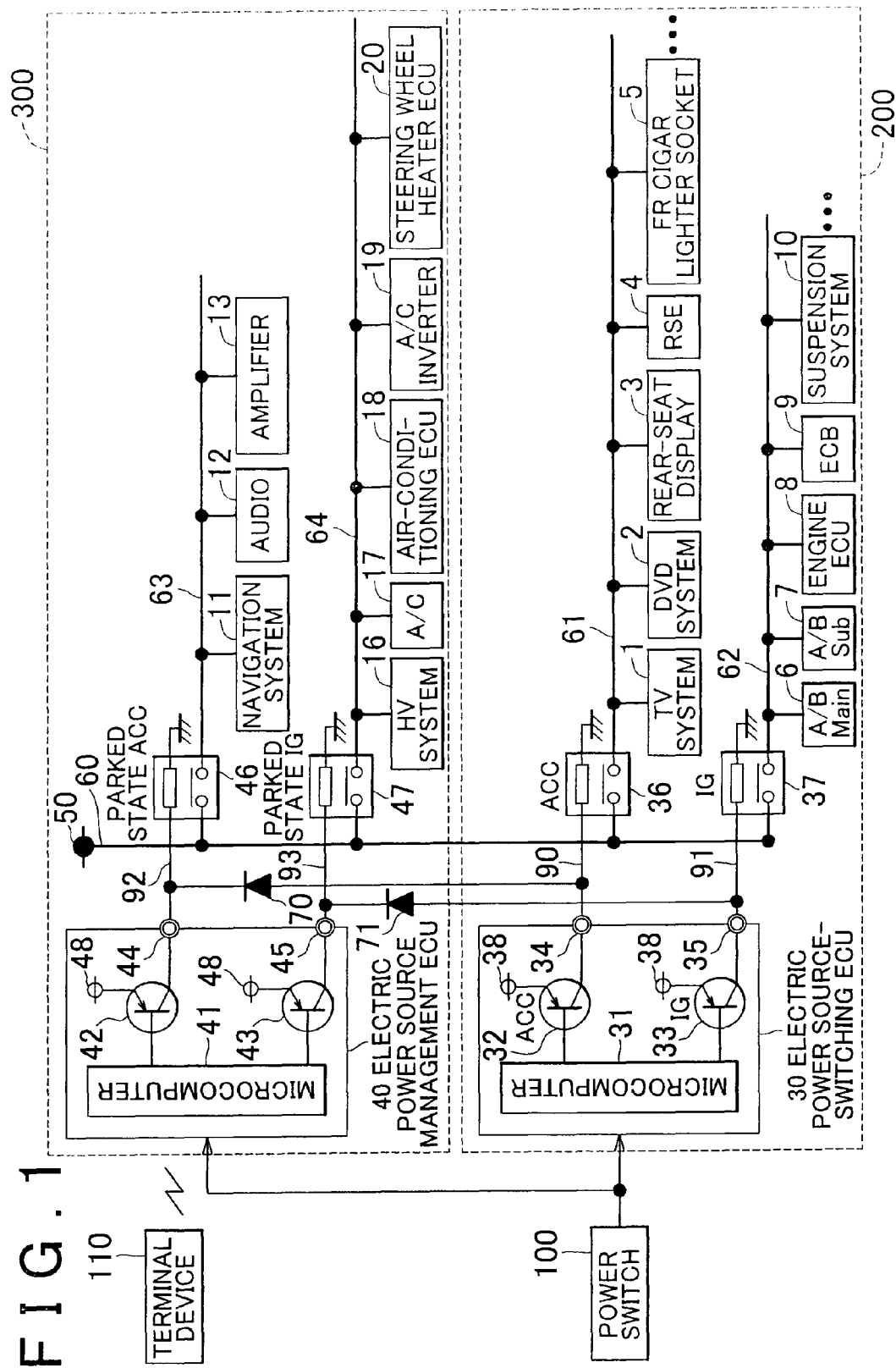
FIG. 1 is a schematic diagram showing the first embodiment of the vehicular electric power source controller.

FIG. 1 is a schematic diagram showing a first embodiment of the vehicular electric power source controller in accordance with the invention. A plurality of electrical loads are mounted in a vehicle. The electrical loads are partially shown in FIG. 1. An electric power source 50 supplies electric power to each electrical load. An electricity storage device, such as a predetermined voltage type (e.g., 14 V type) battery or the like, is connected to the electric power source 50. Furthermore, an electric power generator, which generates electricity by converting kinetic energy to electric energy, may be connected to the electric power source 50. The electric power generator generates electric power using the output of the engine that is provided for running the vehicle. The electric power generated by the electric power generator is supplied to each electrical load, as in the case of an electricity storage device such as a battery or the like. A concrete example of the electric power generator is an alternator. As the rotational speed of the engine rises, the amount of power generated by the alternator increases. If the engine stops, the electric power generation by the alternator also stops.

The electric power supplied from the electric power source 50 is distributed to electric power source supply system lines 61 to 64 via an electric power system line 60, so that electric power is supplied to electrical loads connected to the lines. Electrical loads, for example, a TV system 1, a DVD system 2, a rear-seat display 3, a rear-seat entertainment system (RSE) 4, a front-seat (FS) cigar lighter socket 5, etc., are connected to the accessory electric power source supply system line 61 (hereinafter, referred to as "ACC electric power source 61"). Electrical loads, for example, an airbag main system (A/B Main) 6, an airbag sub-system (A/B Sub) 7, an engine ECU 8, an electronically controlled brake (ECB) 9, a suspension system 10, etc., are connected to the ignition electric power source supply system line 62 (hereinafter, referred to as "IG electric power source 62"). Electrical loads, for example, a navigation system 11, an audio 12, an amplifier 13, etc., are connected to the parked state accessory electric power source supply system line 63 (hereinafter, referred to as "parked state ACC electric power source 63"). Electrical loads, for example, a hybrid (HV) system 16, an air compressor (A/C) 17, an air-conditioning ECU 18, an A/C inverter 19, a steering wheel heater ECU 20, etc., are connected to the parked state ignition electric power source supply system line 64 (hereinafter, referred to as "parked state IG electric power source 64").

Hereinafter, the electrical loads, such as the TV system 1 and the like, that are connected to the ACC electric power source 61 will be referred to as "ACC operation loads". The electrical loads, such as the airbag main system 6 and the like, that are connected to the IG electric power source 62 will be referred to as "IG operation loads". The electrical loads, such as the navigation system 11 and the like, that are connected to the parked state ACC electric power source 63 will be referred to as "parked state ACC operation loads". The electrical loads, such as the HV system 16 and the like, that are connected to the parked state IG electric power source 64 will be referred to as "parked state IG operation loads".

An electric power source management ECU 40 controls the electrification of the parked state ACC operation loads and the parked state IG operation loads by driving electric power source-switching elements (a parked state ACC relay 46 and a parked state IG relay 47) that are set for making it possible to supply electric power from the electric power source 50 during a vehicle parked state where the ACC electric power source 61 and the IG electric power source 62 are not electrified. The electric power source management ECU 40 executes the driving of the parked state ACC relay 46 and the parked state IG relay 47 on the basis of a control signal from a predetermined terminal device 110 that allows the remote control from outside the vehicle, or on the basis of a control signal from a power switch 100 disposed in the vehicle.

The terminal device 110 is operated by a user to control the operation of the parked state ACC operation loads and the parked state IG operation loads. The terminal device 110, for example, may be an item carried by a user, such as a key card for operating the vehicle, a cell phone, a dedicated terminal, etc. Furthermore; the terminal device 110 may also be a stationary device, such as a desktop personal computer or the like.

If a user desires to operate all or one or more of the parked state ACC operation loads and the parked state IG operation loads while the vehicle is parked, the user uses the terminal device 110 to operate the load or loads. When the user performs on the terminal device 110 a predetermined operation to operate all or one or more of the parked state ACC operation loads and the parked state IG operation loads, a control signal for controlling the operation of all or one or more of the parked state ACC operation loads and the parked state IG operation loads is sent from the terminal device 110. When the electric power source management ECU 40 receives the control signal from the terminal device 110, the electric power source management ECU 40 controls the electrification of the parked state ACC operation loads and the parked state IG operation loads in accordance with the control signal.

When the electric power source management ECU 40 receives a control signal for operating all or one or more of the parked state ACC operation loads, the electric power source management ECU 40 turns on the parked state ACC relay 46 in order to electrify the parked state ACC operation loads. In this case, a microcomputer 41 of the electric power source management ECU 40 turns on a transistor 42, so that an internal electric power source 48 is electrically connected to a line 92 and the parked state ACC relay 46 turns on. The on-state of the parked state ACC relay 46 establishes continuity between the electric power source 50 and the parked state ACC electric power source 63, so that the parked state ACC operation loads are electrified.

If the electric power source management ECU 40 receives a control signal for operating all or one or more of the parked state IG operation loads, from the terminal device 110 while the vehicle is parked, the electric power source management ECU 40 turns on the parked state IG relay 47 to electrify the parked state IG operation loads. The microcomputer 41 of the electric power source management ECU 40 turns on a transistor 43, so that the internal electric power source 48 is electrically connected to a line 93 and the parked state IG relay 47 turns on. By turning on the parked state IG relay 47 continuity between the electric power source 50 and the parked state IG electric power source 64 is established, so that the parked state IG operation loads are electrified.

Furthermore, if the electric power source management ECU 40 receives a control signal to de-electrify the parked state ACC operation loads from the terminal device 110 while the vehicle is parked, the electric power source management ECU 40 turns off the transistor 42 to de-electrify the parked state ACC operation loads. If the electric power source management ECU 40 receives a control signal to de-electrify the parked state IG operation loads, the electric power source management ECU 40 turns off the transistor 43 to de-electrify the parked state IG operation loads.

On the other hand, the electric power source-switching ECU 30 not only controls the electrification of the ACC operation loads and the IG operation loads by driving electric power source-switching elements, that is, the ACC relay 36 and the IG relay 37, but also controls the electrification of the parked state ACC operation loads and the parked state IG operation loads by driving the parked state electric power source-switching elements, that is, the parked state ACC relay 46 and the parked state IG relay 47. The electric power source-switching ECU 30 drives the ACC relay 36, the IG relay 37, the parked state ACC relay 46 and the parked state IG relay 47 based on the control signal from the power switch 100.

The power switch 100 is disposed near the driver's seat in the cabin. The user, after entering the vehicle, starts and stops the engine by depressing the power switch 100. In association with the operation of the power switch 100, the electric power source-switching ECU 30 switches the electrification of the ACC operation loads, the IG operation loads, the parked state ACC operation loads and the parked state IG operation loads.

The electric power source-switching ECU 30 has internal states that represent at three electric power selected states, that is, OFF, ACC, and IG-ON.

When the electric power source-switching ECU 30 detects a signal that indicates the power switch 100 is depressed while the internal state of the electric power source-switching ECU 30 is the off-state, the internal state changes from the off-state to the ACC state, so that the electric power source-switching ECU 30 turns on the ACC relay 36 to electrify the ACC operation loads, and turns on the parked state ACC relay 46 to electrify the parked state ACC operation loads. A microcomputer 31 of the electric power source-switching ECU 30 turns on a transistor 32, so that the internal electric power source 38 is electrically connected to a line 90 and the ACC relay 36 turns on, and the internal electric power source 38 is also electrically connected to a line 92 via a diode 70 and the parked state ACC relay 46 turns on. By turning on the ACC relay 36 continuity between the electric power source 50 and an ACC electric power source 61 is established, so that the ACC operation loads are electrified. In addition, turning on the parked state ACC relay 46 establishes continuity between the electric power source 50 and a parked state ACC electric power source 63, so that the parked state ACC operation loads are electrified.

If the electric power source-switching ECU 30 detects a signal indicating the depression of the power switch 100 when the internal state of the electric power source-switching ECU 30 is the ACC state, the internal state changes from the ACC state to the IG state, so that the electric power source-switching ECU 30 turns on the IG relay 37 to electrify the IG operation loads, and also turns on the parked state IG relay 47 to electrify the parked state IG operation loads. The microcomputer 31 of the electric power source-switching ECU 30 turns on a transistor 33, so that the internal electric power source 38 is electrically connected to a line 91 and the ignition relay 37 turns on, and the internal electric power source 38 is also connected to a line 93 via a diode 71 and the parked state IG relay 47 turns on. Turning on the ignition relay 37 establishes continuity between the electric power source 50 and the IG electric power source 62, so that the IG operation loads are electrified. In addition, turning on the parked state IG relay 47 establishes continuity between the electric power source 50 and the parked state IG electric power source 64, so that the parked state IG operation loads are electrified. Therefore, when the engine ECU 8, that is, one of the IG operation loads, is electrified, the engine ECU 8 that controls the starting of the engine is able to actually start the engine.

If the electric power source-switching ECU 30 detects a signal indicating the depression of the power switch 100 when the internal state of the electric power source-switching ECU 30 is the IG-on state during the vehicle stopped state, the internal state changes from the IG-on state to the off-state, so that the ACC relay 36, the ignition relay 37, the parked state ACC relay 46 and the parked state IG relay 47 are turned off to de-electrify the ACC operation loads, the IG operation loads, the parked state ACC operation loads and the parked state IG operation loads. As the microcomputer 31 of the electric power source-switching ECU 30 turns off the transistors 32, 33, the ACC operation loads, the IG operation loads, the parked state ACC operation loads and the parked state IG operation loads are de-electrified. Therefore, because the engine ECU 8, which is one of the IG operation loads, is de-electrified, it becomes possible to stop the engine.

It is to be noted herein that the electric power source management ECU 40 turns off the transistors 42, 43 on the basis of the engine start-requesting control signal from the power switch 100, so that the parked state ACC operation loads and the parked state IG operation loads are de-electrified when the electric power source-switching ECU 30 turns off the transistors 32, 33.

Furthermore, each of the electric power source management ECU 40 and the electric power source-switching ECU 30 includes, in addition to the microcomputer 31 or the microcomputer 41 for processing control process programs, a plurality of circuit elements, such as a ROM that stores the control process programs, a RAM for temporarily storing process data related to the control process programs, an input/output interface for exchanging information with an external device, etc.

Figure 2:
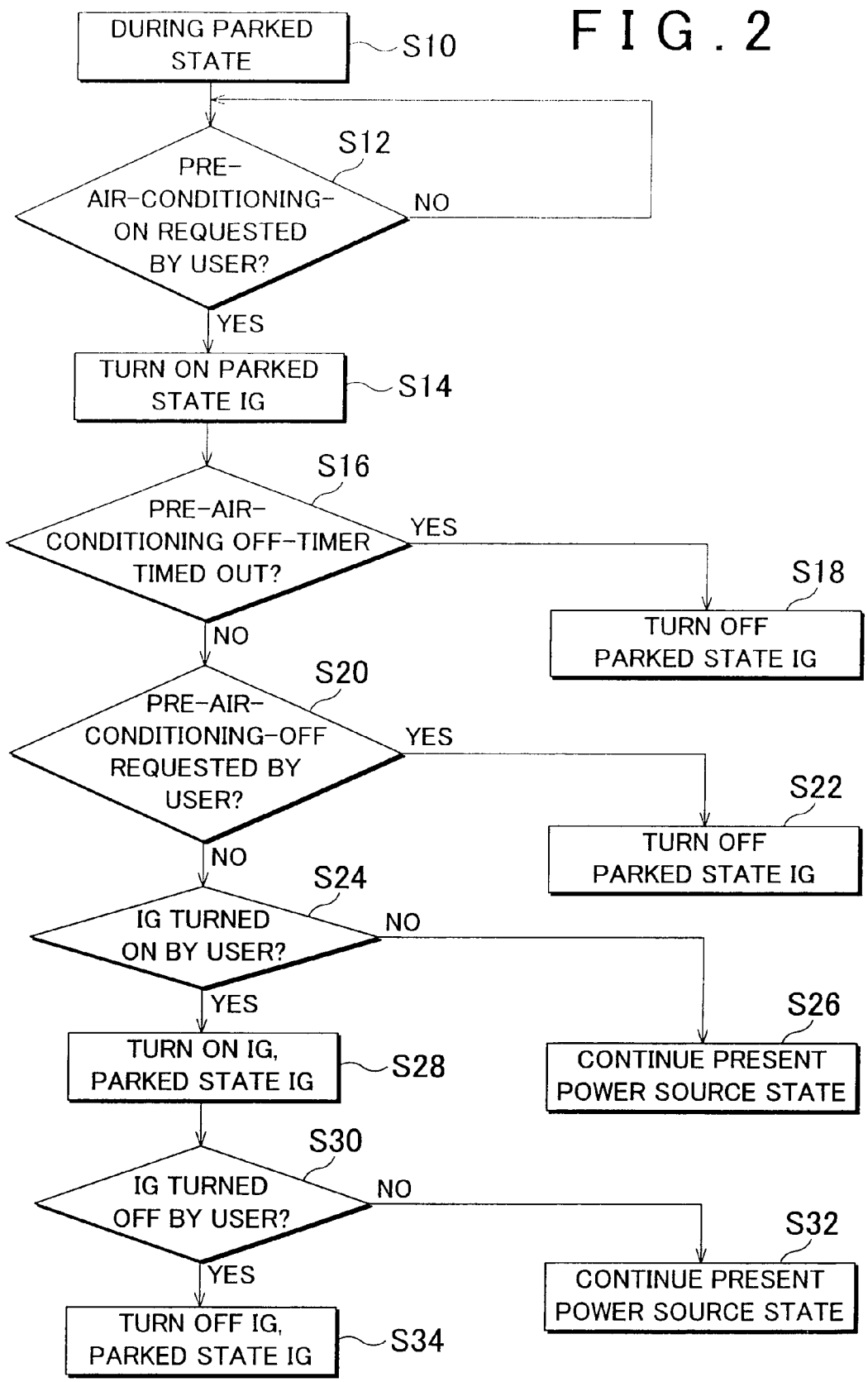
FIG. 2 shows an example of an operation flow in the case where the first embodiment of the vehicular electric power source controller is applied to a parked state air-conditioning system.

An example of the operation of the first embodiment of the foregoing vehicular electric power source controller shown in FIG. 1 will now be described. FIG. 2 shows an example of an operation flow when the first embodiment of the vehicular electric power source controller is applied to a parked state air-conditioning system.

The parked state air-conditioning system is a system in which the air-conditioner may be operated while the vehicle is parked (pre-air-conditioning). That is, before getting into the vehicle, a user can give a command to the vehicle by wireless communication or the like so as to operate the air-conditioner to create a comfortable environment in the cabin. Furthermore, when the user enters the vehicle and starts the engine during air-conditioning while the vehicle is parked, the air-conditioning is desired to continue operating. In recent years, an idling stop or the like has been encouraged, prohibiting the starting of the engine without the attendance of a user. In the case of a hybrid vehicle that employs an engine and an electric motor as power sources, the air-conditioner may be operated without starting the engine because the compressor is electrically powered and is provided with a high-voltage battery. However, even the high-voltage battery is limited in the electric power that can be used for the air-conditioning system while the vehicle is parked. Therefore, wasteful use of electric power undesirably reduces the time during which the air-conditioning may be performed while the vehicle is parked. As a result, the commercial value of the vehicle declines.

Now, the operation flow of FIG. 2 in the case where the first embodiment of the vehicular electric power source controller in accordance with the invention is applied to the air-conditioning system used while the vehicle is parked will be described with reference to FIG. 1.

If the electric power source management ECU 40 receives a pre-air-conditioning activation request from a user via the terminal device 110 (step 10, YES in step 12), the electric power source management ECU 40 turns on the parked state IG relay 47 (step 14). Therefore, the air-conditioning ECU 18, that is, a parked state IG operation load, is electrified, so that the air-conditioning ECU 18 is able to start the execution of the pre-air-conditioning.

Next, the electric power source management ECU 40 determines whether a switch-off timer of the pre-air-conditioning indicates that a predetermined time (e.g., 10 minutes) has elapsed (step 16). Alternatively, the electric power source management ECU 40 acquires from the air-conditioning ECU 18 the determination as to whether the switch-off timer indicates the elapse of the predetermined time (step 16). If the predetermined time has elapsed, the electric power source management ECU 40 turns off the parked state IG relay 47 (step 18). Therefore, the air-conditioning ECU 18 is de-electrified, and the pre-air-conditioning stops.

On the other hand, if the predetermined time has not been exceeded, the electric power source management ECU 40 determines whether there is a pre-air-conditioning termination request from a user via the power switch 100 (step 20). If the termination request is present, the electric power source management ECU 40 turns off the parked state IG relay 47 (step 22). Therefore, the air-conditioning ECU 18 is de-electrified, so that the pre-air-conditioning stops. This process is a result of the user's turning off the pre-air-conditioning, not of the operation of the off-timer.

Furthermore, if the user enters the vehicle and depresses the power switch 100 to start the engine without the pre-air-conditioning termination request from the user via the terminal device 110 (YES in step 24), the electric power source-switching ECU 30, upon detecting the depression of the power switch 100, changes its internal state from the off-state to the IG-on state through the ACC state. As the internal state changes to the ACC state, the electric power source-switching ECU 30 turns on the ACC relay 36 and the parked state ACC relay 46. Then, as the internal state changes to the IG-on state, the electric power source-switching ECU 30 turns on the ignition relay 37 and the parked state IG relay 47 (step 28). Incidentally, if in step 24 there is no depression of the power switch 100 performed by the user to start the engine, the electric power source state in which the parked state IG relay 47 is on continues (step 26).

Then, when the user depresses the power switch 100 to stop the engine (YES in step 30), the electric power source-switching ECU 30 detects the depression of the power switch 100 and changes its internal state from the IG-on state to the off-state. The electric power source-switching ECU 30, whose internal state has changed to the off-state, turns off all of the ACC relay 36, the IG relay 37, the parked state ACC relay 46 and the parked state IG relay 47 (step 34). If in step 30 there is no depression of the power switch 100 performed by the user to stop the engine, the electric power source state in which the ACC relay 36, the IG relay 37, the parked state ACC relay 46 and the parked state IG relay 47 are on is continued (step 32).

Figure 3:
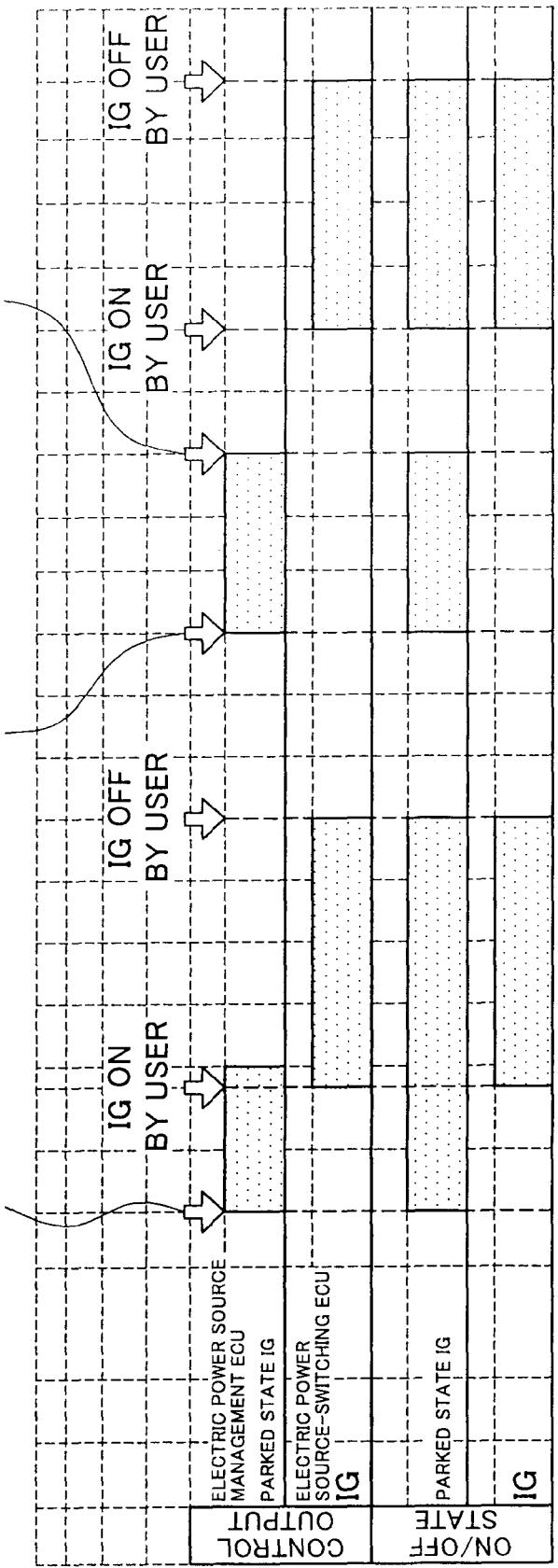
FIG. 3 is a diagram showing the relationship between the control outputs of the electric power source management ECU 40 and the electric power source-switching ECU 30, and the on/off states of the parked state IG relay 47 and the IG relay 37.

With reference to FIG. 3, an example of the operation of the first embodiment of the vehicular electric power source controller will be described more in detail. FIG. 3 is a diagram showing relationships between the control outputs of the electric power source management ECU 40 and the electric power source-switching ECU 30, and the on/off states of the parked state IG relay 47 and the IG relay 37. The upper portion of FIG. 3 shows the state of output of the drive signal for the transistor 43 that is output by the microcomputer 41 of the electric power source management ECU 40, and the state of output of the drive signal for the transistor 33 that is output by the microcomputer 31 of the electric power source-switching ECU 30. The lower portion of FIG. 3 shows the on/off states of the parked state IG relay 47 and the ignition relay 37.

Referring to a left side of FIG. 3, when a request to commence operation of a parked state IG operation load is made, such as the air-conditioning ECU 18 or the like, the microcomputer 41 of the electric power source management ECU 40 turns on the parked state IG relay 47 by outputting a drive signal that turns on the transistor 43.

Then, if the user depresses the power switch 100 to start the engine (if there is an IG-on request from the user) while the parked state IG relay 47 is on, the microcomputer 31 of the electric power source-switching ECU 30 turns on the IG relay 37 by outputting a drive signal to turn on the transistor 33, and the microcomputer 41 of the electric power source management ECU 40 outputs a drive signal to turn off the transistor 43. Although the electric power source management ECU 40 outputs the drive signal to turn off the transistor 43, the parked state IG relay 47 continues to be on via the diode 71 due to the output of the drive signal that turns on the transistor 33. This operation avoids a state in which the parked state IG relay 47 is turned on by both the electric power source management ECU 40 and the electric power source-switching ECU 30. That is, this prevents misoperations due to control interference.

After that, if the user depresses the power switch 100 to stop the engine (if there is an IG-off request from the user), the microcomputer 31 turns off both the IG relay 37 and the parked state IG relay 47 by outputting the drive signal to turn off the transistor 33.

The right side of FIG. 3 shows an instance that is different from that shown in the left side of FIG. 3. The right half of FIG. 3 shows an instance in which a request to end the operation of the parked state IG operation loads is made before the user depresses the power switch 100 to start the engine (before the IG-on request from the user occurs).

Referring to the right side of FIG. 3, when a request for commencing the operation of a parked state IG operation load, such as the air-conditioning ECU 18 or the like, is made, the microcomputer 41 of the electric power source management ECU 40 turns on the parked state IG relay 47 by outputting the drive signal to turn on the transistor 43.

Then, when a commencement request regarding a parked state IG operation load is made via the terminal device 110 before the IG-on request by the user occurs, the microcomputer 41 of the electric power source management ECU 40 turns off the parked state IG relay 47 by outputting the drive signal to turn off the transistor 43. When the IG-on request by the user occurs after the parked state IG relay 47 turns off, the microcomputer 31 of the electric power source-switching ECU 30 turns on the IG relay 37 and turns on the parked state IG relay 47 by outputting the drive signal to turn on the transistor 33.

After that, when the user depresses the power switch 100 to stop the engine (when the IG-off request by the user occurs), the microcomputer 31 of the electric power source-switching ECU 30 turns off both the IG relay 37 and the parked state IG relay 47 by outputting the drive signal to turn off the transistor 33.

In this manner, in the case where the pre-air-conditioning is performed, the electrical loads other than the parked state IG operation loads, for example, as the IG operation loads, are not supplied with electric power. Thus; the power consumption can be curbed in the systems that do not need to be operated while the vehicle is parked, such as the lighting of the instrument panel meters or the like. Furthermore, because electric power of the electric power source 50 is supplied to a specific electrical load, the operation time of the pre-air-conditioning due to a decline in the power supplying performance of the electric power source 50 can be prevented form reducing. Furthermore, even if the ECU needed for the pre-air-conditioning is an ECU that is connected to the IG electric power source 62, that ECU can be connected, without having to be changed in any manner, to the parked state IG electric power source 64, which is the same electric power source that the air-conditioning ECU 18 is connected to. Seen from that ECU, there is no difference in the form of powering on the ECU between the case where the ECU is connected to the IG electric power source 62 and the case where the ECU is connected to the parked state IG electric power source 64.

Furthermore, when the electrification of the IG electric power source 62 is controlled by the electric power source-switching ECU 30 on the basis of the user's operation of the power switch 100, the electrification of the parked state IG electric power source 64 is also controlled. Therefore, there is no need to connect the IG electric power source 62 to the parked state operation loads of the system of the parked state IG electric power source 64, and fewer wire harness are needed.

Therefore, in the first embodiment of the vehicular electric power source controller, if an electrical load desired to be used while the vehicle is parked where the ACC electric power source 61 and the IG electric power source 62 are in the non-electrified state is set as a parked state ACC operation load or a parked state IG operation load, the parked state ACC operation load, for example, is electrified without electrifying the ACC operation loads nor the IG operation loads, by turning on the parked state ACC relay 46 while the ACC relay 36 and the IG relay 37 are off. Thus, the wasteful electricity consumption while the vehicle is parked is reduced in comparison with the construction where the parked state ACC relay 46 is not provided. Furthermore, by turning on the parked state IG relay 47 while the ACC relay 36 and the IG relay 37 are off, the parked state IG operation load is electrified without electrifying the ACC operation loads nor the IG operation loads. Thus, the wasteful electricity consumption while the vehicle is parked is reduced in comparison with the case where the parked state IG relay 47 is not provided.

Figure 4:
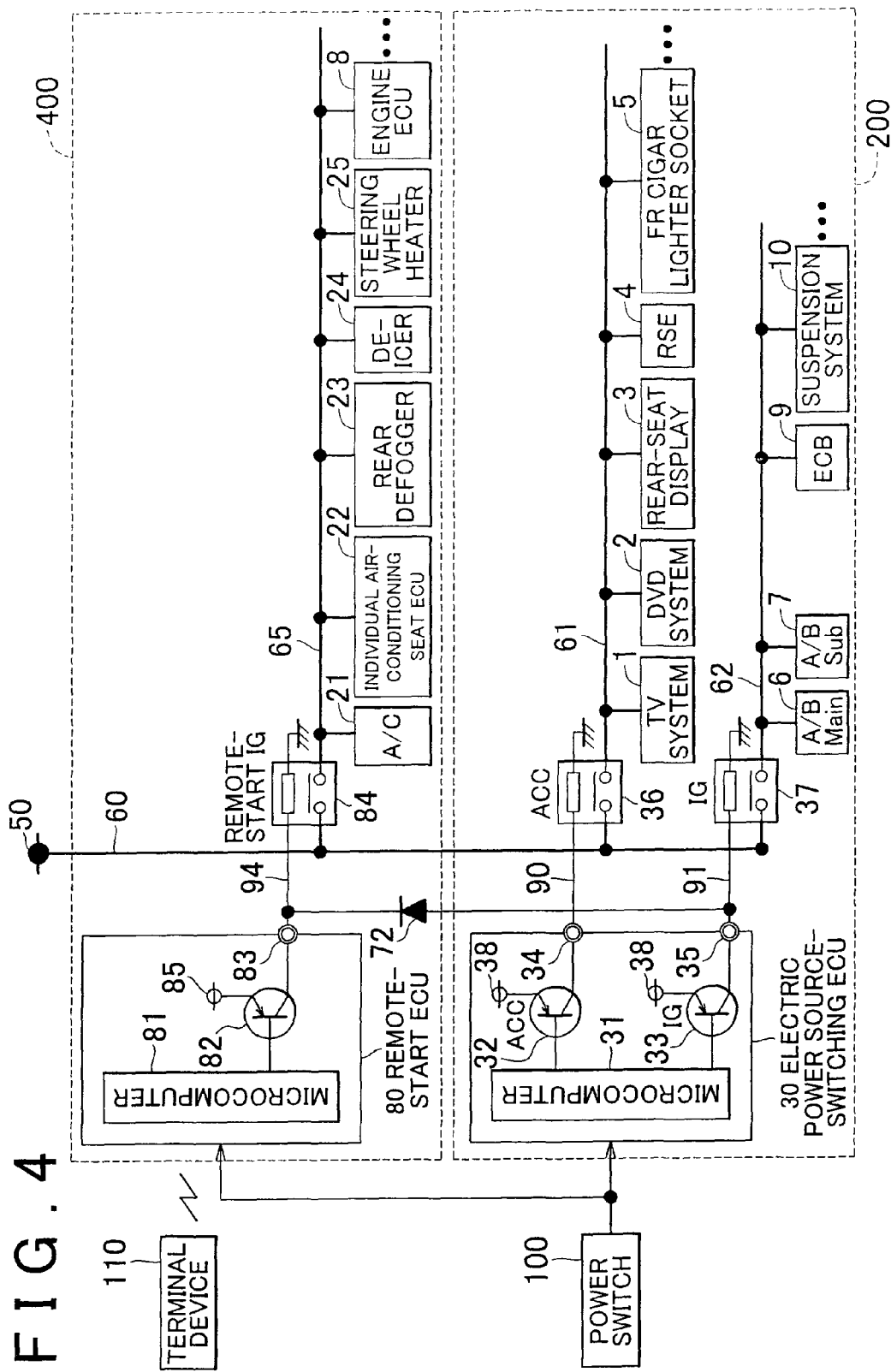
FIG. 4 is a schematic diagram showing the second embodiment of the vehicular electric power source controller.

FIG. 4 is a construction diagram showing a second embodiment of the vehicular electric power source controller in accordance with the invention. In the second embodiment shown in FIG. 4, the portions represented by the same reference characters as those used in conjunction with the first embodiment in FIG. 1 have the same constructions and functions, and the descriptions thereof will be omitted or simplified.

In the second embodiment, the vehicular electric power source controller is applied to a remote engine start system. The remote engine start system (hereinafter, simply referred to as "remote start" or "remote starter") is a system that starts the engine of the vehicle by a remote control from outside the vehicle. The remote starter is often used to clear the frost or snow impeding visibility or perform the air-cooling or heating before the user enters the vehicle. The electrical loads that need to be operated to accomplish such purposes are loads that consume relatively large electric power, for example, a rear defogger, a de-icer, a mirror heater, an air-conditioner compressor, etc. Because the engine, when started by the remote starter, is operated in an idling state, the rotation speed of the engine is low and the amount of electric power generated by the generator (alternator) is small. Therefore, it is often the case that electric power supplied from the battery. Hence, in the case of the engine startup by the remote starter, the discharge from the battery is great despite the operation of the engine and there is a risk that the battery charge may decline more than necessary. Furthermore, in the case of the engine startup by the remote starter, it is encouraged to stop the engine once before running the vehicle, and therefore restart of the engine is needed. Hence, in a situation where the battery charge has reduced (furthermore, where the discharge performance of the battery is bad in a low-temperature condition, in which the remote starter is used frequently), there is a risk of deterioration of the startability at the time of restarting the engine.

Furthermore, even in the case of startup by the remote starter, the starting control of the engine is performed in substantially the same manner as in the case where the user starts the engine by using a key or the like after entering the vehicle. Therefore, in the existing construction, the startup by the remote starter involves electrification of the accessory electric power and the ignition electric power, and therefore electrification occurs with regard to the electrical loads that are not needed at the time of remote start (e.g., electrical loads operated by the accessory electric power, such as a cigar lighter socket or the like, and electrical loads, such as instrument panel meters, surrounding monitor sensors, etc.).

The construction of the second embodiment of the vehicular electric power source controller in accordance with the invention shown in FIG. 4 will be described. The electric power supplied from the electric power source 50 is distributed to electric power source supply system lines 61, 62, 65 via an electric power system line 60, and is supplied to the electrical loads connected to the lines 61, 62, 65. The ACC electric power source 61 is connected to electrical loads such as a TV system 1, a DVD system 2, a rear-seat display 3, a rear-seat entertainment system (RSE) 4, a front-seat (FS) cigar lighter socket 5, etc. The IG electric power source 62 is connected to electrical loads such as an airbag main system (A/B Main) 6, an airbag sub-system (A/B Sub) 7, an electronically controlled brake (ECB) 9, a suspension system 10, etc. The remote start-time electric power source supply system line 65 (hereinafter, referred to as "remote start-time electric power source 65") is connected to electrical loads such as an air compressor 21, an individual-seat air-conditioning seat ECU 22, a rear defogger 23, a de-icer 24, a steering wheel heater 25, an engine ECU 8, etc. The remote start-time electric power source 65 may be connected to electrical loads that need to be operated when the remote start is performed.

Hereinafter, the electrical loads, such as the TV system 1 and the like, that are connected to the ACC electric power source 61 will be referred to as "ACC operation loads", and the electrical loads, such as the airbag main system 6 and the like, that are connected to the IG electric power source 62 will be referred to as "IG operation loads", and the electrical loads, such as the engine ECU 8 and the like, that are connected to the remote start-time electric power source 65 will be referred to as "remote start-time operation loads".

A remote-start ECU 80 controls the electrification of the remote start-time operation loads by driving a remote-start IG relay 84 that is an electric power source-switching element that has been set so as to allow the supply of electric power from the electric power source 50 when the engine is started by the remote starter, when the vehicle is parked, where the ACC electric power source 61 and the IG electric power source 62 are not electrified. The remote-starter ECU 80 drives the remote-start IG relay 84 on the basis of a control signal from a predetermined terminal device 110 that allows the remote control from outside the vehicle, or on the basis of a control signal from a power switch 100 disposed in the vehicle.

The terminal device 110 is operated by a user to control the operation of the remote starter. The terminal device 110 is, for example, a device that is carried by a user, such as a key card for operating the vehicle, a cell phone, a remote starter-dedicated terminal, etc. Furthermore, the terminal device 110 may also be a stationary device, such as a desktop personal computer or the like.

A user uses the terminal device 110 to request the operation or stop of the remote starter. The user performs a predetermined operation for operating or stopping the remote starter on the terminal device 110 so that a control signal that requests the operation or stop of the remote starter is sent from the terminal device 110. Receiving the control signal from the terminal device 110, the remote-starter ECU 80 controls the operation and stop of the remote starter in accordance with the control signal.

When the remote-starter ECU 80 receives the control signal that requests the operation of the remote starter, the remote-starter ECU 80 turns on the remote-start IG relay 84 in order to electrify the remote start-time operation loads. The microcomputer 81 of the remote-starter ECU 80 turns on a transistor 82, so that an internal electric power source 85 is electrically connected to a line 94 and the remote-start IG relay 84 turns on. Turning on the remote-start IG relay 84 establishes continuity between the electric power source 50 and the remote start-time electric power source 65, so that the remote start-time operation loads are electrified. Therefore, when the engine ECU 8, that is, one of the remote start-time operation loads, is electrified, the engine ECU 8 is able to start the engine (operation of the remote starter). Furthermore, along with the operation of the remote starter, the operation of electrical loads, such as the air compressor 21 and the like, are also enabled.

If the remote-starter ECU 80 receives a control signal that requests a stop of the operation of the remote starter from the terminal device 110 while the vehicle is parked, the remote-starter ECU 80 de-electrifies the remote start-time operation loads by turning off the transistor 82. Therefore, the engine ECU 8, one of the remote start-time operation loads, is de-electrified, so that the engine stops (stop of the operation of the remote starter). Furthermore, along with the stop of the operation of the remote starter, the operation of electrical loads, such as the air compressor 21 and the like, also stops.

On the other hand, the electric power source-switching ECU 30 not only controls the electrification of the ACC operation loads and the IG operation loads by driving the electric power source-switching elements, that is, the ACC relay 36 and the IG relay 37, but also controls the electrification of the remote start-time operation loads by driving the remote-start IG relay 84. In association with the operation of the power switch 100 by the user performs after entering the vehicle, the electric power source-switching ECU 30 switches the electrification of the ACC operation loads, the IG operation loads, the remote start-time operation loads.

When the electric power source-switching ECU 30 detects a signal indicating the depression of the power switch 100 while the internal state of the electric power source-switching ECU 30 is OFF, the internal state changes from OFF to ACC, so that the electric power source-switching ECU 30 turns on the ACC relay 36 to electrify the ACC operation loads. The microcomputer 31 of the electric power source-switching ECU 30 turns on the transistor 32, so that the internal electric power source 38 is electrically connected to a line 90 and the ACC relay 36 turns on. Turning on the ACC relay 36 establishes continuity between the electric power source 50 and the ACC electric power source 61, so that the ACC operation loads are electrified.

When the electric power source-switching ECU 30 detects a signal indicating the depression of the power switch 100 while the internal state of the electric power source-switching ECU 30 is the ACC-state, the internal state changes from the ACC-state to the IG state, so that the electric power source-switching ECU 30 turns on to electrify the IG operation loads, and turns on the remote-start IG relay 84 to electrify the remote start-time operation loads. The microcomputer 31 of the electric power source-switching ECU 30 turns on the transistor 33, so that the internal electric power source 38 is electrically connected to a line 91 and the IG relay 37 turns on, and the internal electric power source 38 is also electrically connected to a line 94 via the diode 72 and the remote-start IG relay 84 turns on. Turning on the IG relay 37 establishes continuity between the electric power source 50 and the IG electric power source 62, so that the IG operation loads are electrified. Furthermore, by turning on the remote-start IG relay 84 establishes continuity between the electric power source 50 and the remote start-time electric power source 65, so that the remote start-time operation loads are electrified. Therefore, when the engine ECU 8, that is, one of the remote start-time operation loads, is electrified, the engine ECU 8 is able to start the engine.

When the electric power source-switching ECU 30 detects a signal indicating the depression of the power switch 100 while the internal state of the electric power source-switching ECU 30 is the IG-on state when the vehicle is parked, the internal state changes from the IG-on state to the off-state, so that all of the ACC relay 36, the ignition relay 37 and the remote-start IG relay 84 are turned off to de-electrify all of the ACC operation loads, the IG operation loads and the remote start-time operation loads. As the microcomputer 31 of the electric power source-switching ECU 30 turns off the transistors 32, 33, all of the ACC operation loads; the IG operation loads and the remote start-time operation loads are de-electrified. Therefore, because the engine ECU 8, that is, one of the remote start-time operation loads, becomes de-electrified, it becomes possible to stop the engine.

It is to be noted that the remote-starter ECU 80 turns off on the basis of the engine start-requesting control signal from the power switch 100, so that the remote start operation loads are de-electrified when the electric power source-switching ECU 30 turns off the transistors 32, 33. This operation avoids the situation in which the remote-start IG relay 84 is turned on by both the remote-starter ECU 80 and the electric power source-switching ECU 30. That is, this prevents misoperations due to control interference.

Figure 5:
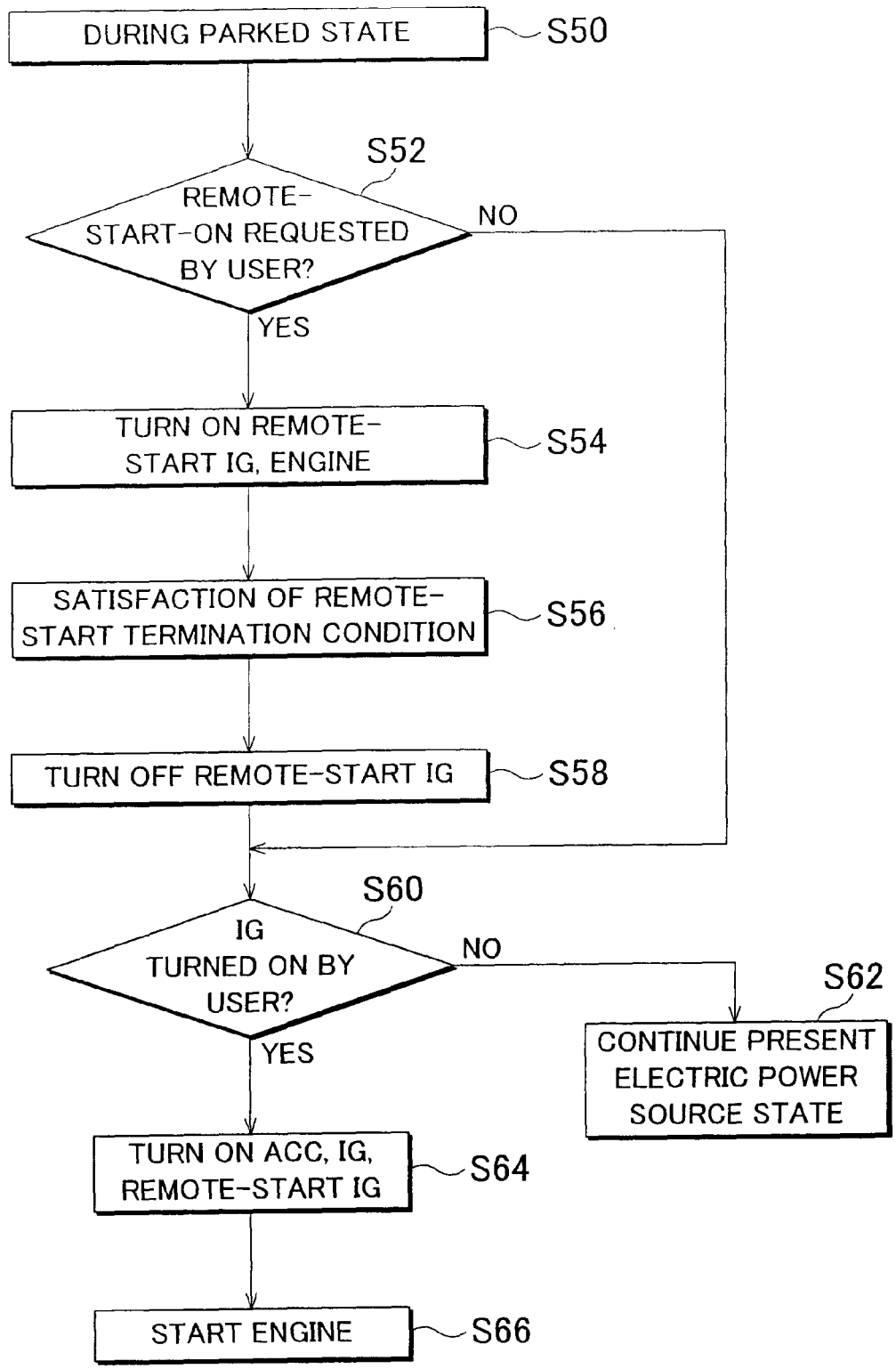
FIG. 5 shows an example of the operation flow of the second embodiment of the vehicular electric power source controller.

Now, an example of the operation of the second embodiment of the vehicular electric power source controller shown in FIG. 4 will be described. FIG. 5 shows an example of the operation flow of the second embodiment of the vehicular electric power source controller. If the remote-starter ECU 80 receives a remote starter-on request by a user via the terminal device 110 when the vehicle is parked (step 50, YES in step 52), the remote-starter ECU 80 turns on the remote-start IG relay 84 (step 54). Therefore, the engine ECU 8, that is, a remote start operation load, is electrified, and the engine ECU 8 starts the engine (step 54). As the remote starter operates, the operation of electrical loads, such as the air compressor 21 and the like, becomes possible.

Next, when the remote-start termination condition is satisfied (e.g., when a user's stop request occurs, the operation of a switch-off timer, the opening of a door, a shift lever operation to a position other than the P range, etc.) (step 56), the remote-starter ECU 80 turns off the remote-start IG relay 84 (step 58). Therefore, the engine ECU 8, that is, a remote start-time operation load, becomes de-electrified, so that the engine stops (stop of the operation of the remote starter). As the remote starter stops operating, the operation of the electrical loads, such as the air compressor 21 or the like, also stops.

Furthermore, if the user does not make a remote start-on request via the terminal device 110, but enters the vehicle and depresses the power switch 100 to start the engine (NO in step 52, YES in step 60), or if the user depresses the power switch 100 to start the engine after the operation of the remote starter stops (step 58, YES in step 60), the electric power source-switching ECU 30 detects the depression of the power switch 100, and changes its internal state from the off-state to the IG-on state through the ACC state. As the internal state changes to the ACC state, the electric power source-switching ECU 30 turns on the ACC relay 36. Then, as the internal state changes to the IG-on state, the electric power source-switching ECU 30 turns on the IG relay 37 and the remote-start IG relay 84 (step 64). Then, the engine ECU 8, that is, a remote start-time operation load, is electrified, and the engine ECU 8 starts the engine (step 66). Besides, other electrical loads, such as the air compressor 21 and the like, become able to run. Incidentally, if in step 60 the power switch 100 is not depressed by the user to start the engine, the electric power source state in which the ACC relay 36, the IG relay 37 and the remote-start IG relay 84 are off continues (step 62).

Figure 6:
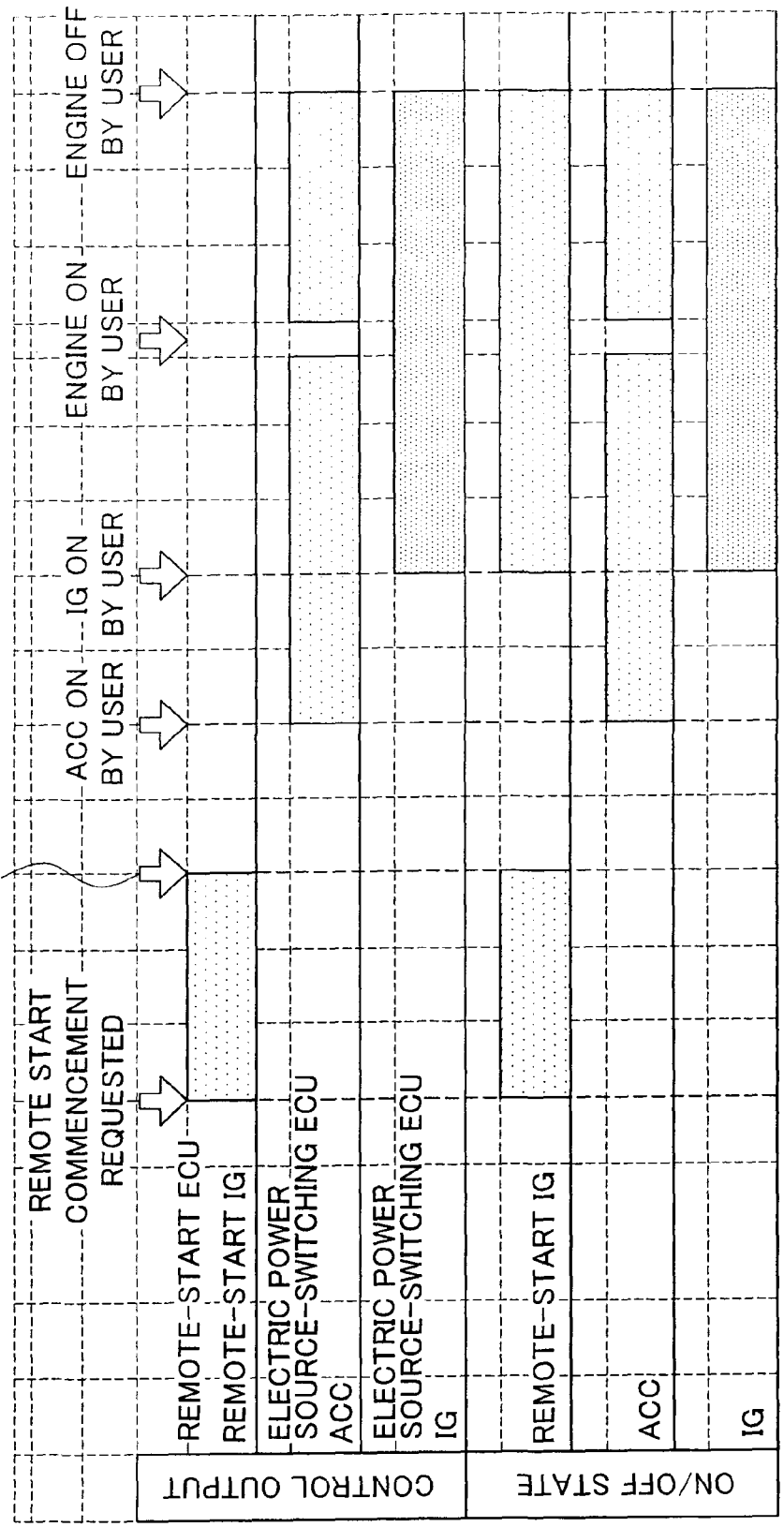
FIG. 6 is a diagram showing the relationship between the control outputs of the remote-starter ECU 80 and the electric power source-switching ECU 30 and the on/off states of the remote-start IG relay 84, the ACC relay 36 and the IG relay 37.

With reference to FIG. 6, an example of the operation of the second embodiment of the vehicular electric power source controller will be described more in detail. FIG. 6 is a diagram showing relationships between the control outputs of the remote-starter ECU 80 and the electric power source-switching ECU 30 and the on/off states of the remote-start IG relay 84, the ACC relay 36 and the IG relay 37. The upper portion of the FIG. 6 shows the state of output of the drive signal for the transistor 82 that is output by the microcomputer 81 of the remote-starter ECU 80, and the states of output of the drive signals for the transistors 32, 33 that are output by the microcomputer 31 of the electric power source-switching ECU 30. The lower portion of FIG. 6 shows the on/off states of the remote-start IG relay 84, the ACC relay 36 and the IG relay 37.

In FIG. 6, when a remote-start operation request occurs, the microcomputer 81 of the remote-starter ECU 80 turns on the remote-start IG relay 84 by outputting a drive signal that turns on the remote-start IG relay 84. Therefore, the engine starts. After that, when the remote-start termination condition is satisfied, the microcomputer 81 of the remote-starter ECU 80 turns off the remote-start IG relay 84 by outputting a drive signal that turns off the remote-start IG relay 84. Therefore, the operation of the engine stops.

On the other hand, if the user depresses the power switch 100 to power on the ACC electric power source 61 (if there is an ACC-on request by the user), the microcomputer 31 of the electric power source-switching ECU 30 turns on the ACC relay 36 by outputting a drive signal that turns on the transistor 32.

Then, if the user depresses the power switch 100 to start the engine (if there is an IG-on request by the user), the microcomputer 31 of the electric power source-switching ECU 30 outputs the drive signal that turns on the transistor 33, so that the IG relay 37 turns on, and the remote-start IG relay 84 turns on via the diode 72. At this time, the microcomputer 31 of the electric power source-switching ECU 30 may output a drive signal that turns off the transistor 32 until the starting of the engine is completed, in order to improve the startability of the engine. Because the output of the drive signal that turns off the transistor 32 also turns off the ACC relay 36, the electricity consumption by the ACC operation loads, such as the TV system 1 and the like, is reduced, and the electric power supplying performance of the electric power source 50 correspondingly increases, and the operation characteristic of the starter for starting the engine improves.

After that, when the user depresses the power switch 100 to stop the engine (if there is an IG-off request by the user), the microcomputer 31 of the electric power source-switching ECU 30 turns off the ACC relay 36 by outputting the drive signal that turns off the transistor 32, and turns of the remote-start IG relay 84 and the IG relay 37 by outputting the drive signal that turns off the transistor 33.

Therefore, in the second embodiment of the vehicular electric power source controller, if an electrical load desired to be used when the remote start is performed is set as a remote start-time operation load, the remote start-time operation load is electrified without electrifying the ACC operation loads or the IG operation loads, by turning on the remote-start IG relay 84 while the ACC relay 36 and the IG relay 37 are off. Thus, the wasteful electricity consumption when the remote start is curbed in comparison with the construction where the remote-start IG relay 84 is not provided. That is, because the remote start-time electric power source 65 is set, it is possible to operate only the systems needed at the time of the remote start, such as the systems that perform the engine start, the air-conditioning, the visibility securement, etc. Thus, the wasteful consumption of the electricity from the battery can be curbed. This improves the startability of the engine when the user, after entering the vehicle, starts the engine from a stopped state.

Furthermore, because the remote start-time electric power source 65 is set, the ECU needed for the remote start may be connected to the remote start-time electric power source 65 without a need to change the ECU in any manner even if the ECU is an ECU that is connected to the IG electric power source 62. Seen from the ECU needed for the remote start, there is no difference in the form of powering on the ECU between the case where the ECU is connected to the IG electric power source 62 and the case where the ECU is connected to the remote start-time electric power source 65.

Furthermore, if the electrification of the IG electric power source 62 is controlled by the electric power source-switching ECU 30 on the basis of the user's operation of the power switch 100, the electrification of the remote start-time electric power source 65 is also controlled. Therefore, there is no need to connect the IG electric power source 62 to the start-time operation loads of the remote start-time electric power source 65, and the number of wire harnesses used can be reduced.

While example embodiments of the invention have been described above, the invention is not restricted to the foregoing embodiments. On the contrary, it is possible to add various modifications and substitutions to the foregoing embodiments without departing from the scope of the invention.

Figure 7:
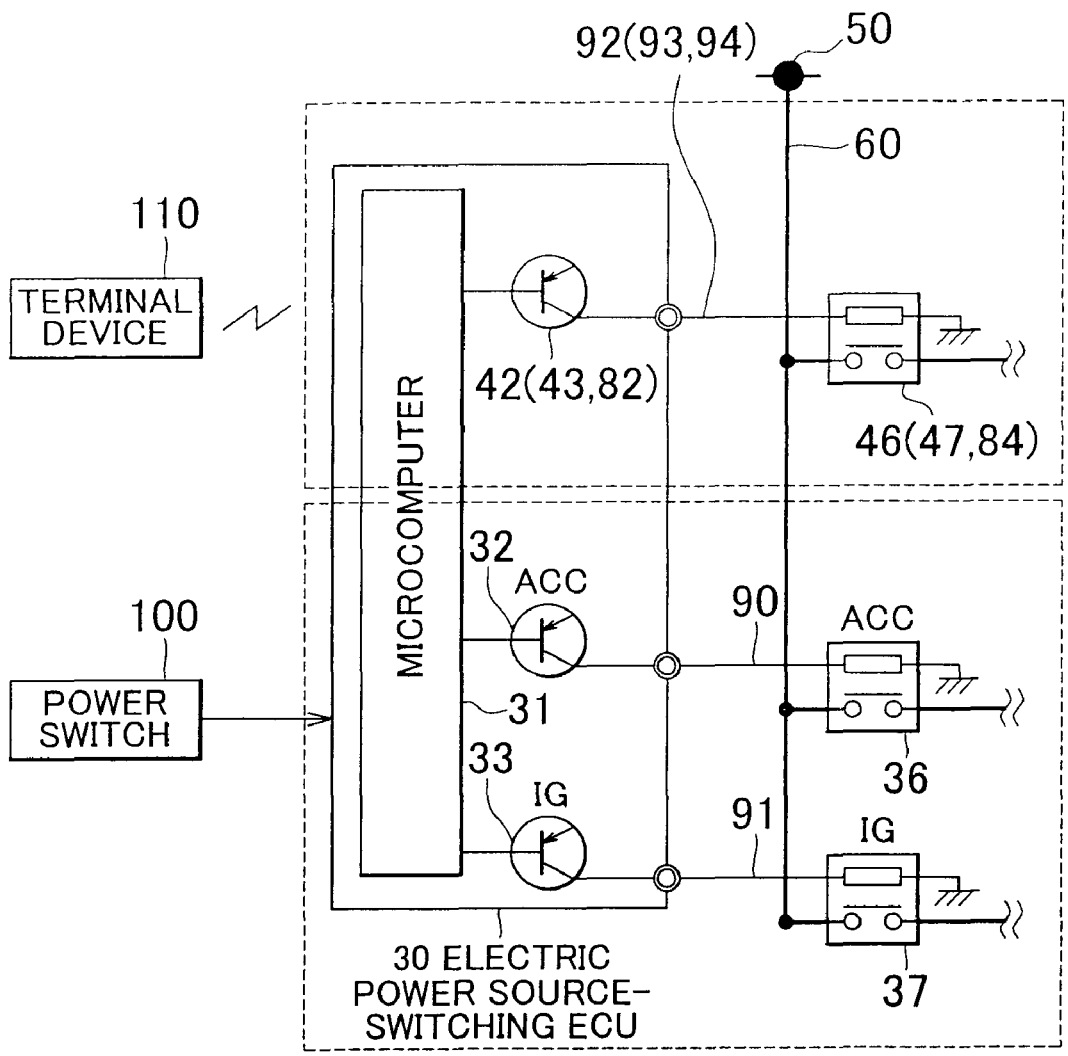
FIG. 7 is a diagram showing a construction in which the driving of relays is performed on a single ECU or microcomputer.

For example, in the foregoing embodiments, the ECU functions are separated between the electric power source management ECU 40 and the electric power source-switching ECU 30 (the ECU functions are separated to the remote-starter ECU 80 and the electric power source-switching ECU 30). However, as shown in FIG. 7, the vehicular electric power source controller may also be operated by a single ECU or one microcomputer. Therefore, because the microcomputer 31 hums the individual transistors on/off independently, of each other, the use of the diodes in the foregoing embodiments can be reduced. The operation flow in this case is substantially the same as the foregoing operation flow.

The invention claimed is:

1. A vehicular electric power source controller that controls electrification of an electrical load mounted in a vehicle, the vehicular electric power source controller comprising:
    an operation input device that is located in a vehicle cabin, and that accepts an operation input from a user;
    a first electrical load mounted in the vehicle;
    a second electrical load that is electrified preferentially over the first electrical load when the vehicle is parked;
    a first switching device;
    a second switching device;
    a first electrical switching element that switches the electrification of the first electrical load; and
    a second electrical switching element that switches the electrification of the second electrical load,
    wherein switching by the first switching device is performed based on a first control signal from the operation input device, and when the first control signal from the operation input device is detected, the first switching device commands to electrify the first electrical switching element and the second electrical switching element to switch the electrification of the first electrical load and the electrification of the second electrical load; and
    switching by the second switching device is performed based on a second control signal from a terminal device that wirelessly communicates with the vehicle, and when the second control signal from the terminal device is received, the second switching device commands to electrify only the second electrical switching element to switch the electrification of only the second electrical load, and
    the second switching device includes a prohibition device that prohibits electrification of the first electrical load by the first electrical switching element.

2. The vehicular electric power source controller according to claim 1, wherein the second switching device outputs an off-command to de-electrify the second electrical load after the first switching device outputs an on-command to electrify the second electrical load.

3. The vehicular electric power source controller according to claim 1, wherein if an on-command output by the first switching device to electrify the second electrical load overlaps with an off-command output by the second switching device to de-electrify the second electrical load, the on-command is preferentially carried out.

4. The vehicular electric power source controller according to claim 1, wherein the first electrical load includes an electrical load that starts an engine.

5. The vehicular electric power source controller according to claim 1, wherein the second electrical load includes an electrical load that controls air-conditioning in a vehicle cabin.

6. The vehicular electric power source controller according to claim 1, wherein the prohibition device is a diode.

* * * * *